UNITED STATES PATENT OFFICE.

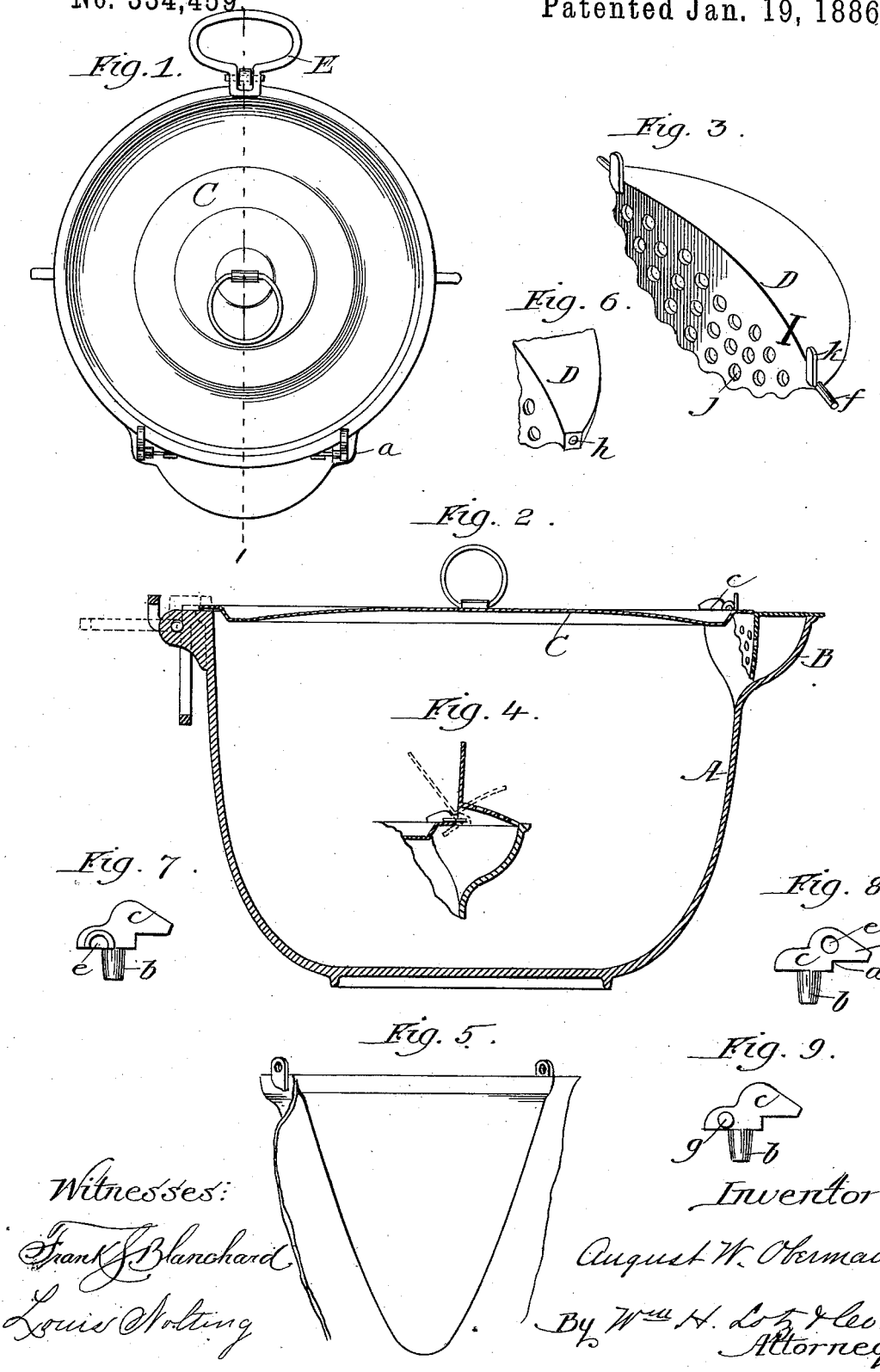

AUGUST W. OBERMANN, OF CHICAGO, ILLINOIS.

COOKING-VESSEL.

SPECIFICATION forming part of Letters Patent No. 334,459, dated January 19, 1886.

Application filed July 8, 1884. Serial No. 137,106. (No model.)

*To all whom it may concern:*

Be it known that I, AUGUST W. OBERMANN, a citizen of the United States of America, residing at Chicago, in the county of Cook and State of Illinois, have invented certain new and useful Improvements in Cooking-Vessels, of which the following is a specification, reference being had therein to the accompanying drawings.

My invention relates to certain improvements in cooking-vessels and other like articles.

The object of the invention is to provide such articles with a hinged strainer situated within the discharging-spouts, and also with a hinged cover adapted to close the spout when desired. Heretofore articles of this class have been provided with such a hinged cover for the spout and with a fixed or stationary strainer situated within said spout; but in use it has been found that with certain articles placed in the vessels it becomes impossible to pass them through the discharging-spout, owing to their inability to pass through the strainer, and therefore it is desirable that the strainer should be so arranged that when desired it may be adjusted to leave the discharge-spout clear; and to the accomplishment of this end the invention consists of certain novel devices and combination of devices, as will be fully described and claimed.

Reference will be made to the accompanying drawings, in which Figure 1 is a top plan view of a cooking-vessel with my improvements; Fig. 2, a section on line 1 1 of Fig. 1; Fig. 3, a detail of the strainer and flap; Fig. 4, a sectional view through part of a vessel, showing the cover and strainer in different positions; Fig. 5, a detail of a spout to be made separate and attached to vessels, and Figs. 6, 7, 8, and 9 views in detail of parts used and modifications thereof.

Like letters refer to like parts in each view.

A represents a cooking-vessel of any suitable size and form; B, the discharge-spout, formed therewith, and C the lid or cover for the vessel. Upon the upper edge of the vessel and at each side of the discharge-spout there is formed a small lug, *a*, through each of which a suitable opening is made to receive the pin *b* of a bearing-plate, *c*, which is also formed with a hook portion, *c'*, Fig. 8. This portion *c'* is cut away slightly, as at *d*, (its rear end,) sufficiently to leave a space between it and the upper edge of vessel, the object of which will be explained. At a point near the upper edge of each bearing-plate *c* there is formed an opening, *e*, into which trunnions *f* are adapted to fit, there being one of such trunnions upon each end of the combined cover and strainer. (Shown in Fig. 3.) It will be understood that the openings *e* for trunnions *f* may be formed as shown in Fig. 7, or that the trunnion may be formed upon the hook, as at *g*, Fig. 9, and the sockets formed in each end of the cover and strainer, as at *h* of Fig. 6. This combined cover and strainer consists of a strip, D, of suitable material, bent at its center, one half being left solid while the remaining portion is provided with perforations *j* to form the strainer. The outer edges of this strip D are preferably rounded to make them fit more perfectly within the spout. At each side edge of this strip, and at a point where it is bent to form the cover and strainer, there is provided a lug, *k*. (Shown clearly in Fig. 3.) The vessel-cover C is placed upon the top of the vessel, and at its front edge is inserted between the top of the vessel and the bearing-plate *c*, the cut-away portions *d* of said hooks allowing of such an arrangement, and when the vessel is to be tilted this cover is held at its rear edge by a handle, E, to be hereinafter referred to.

The parts being in the position shown in Fig. 2, and the vessel tilted to discharge its contents through the spout B, the solid portion of the strip D will be raised from the spout, and at the same time the strainer or perforated portion of said strip D is raised to the position originally occupied by the solid portion of said strip, the parts being brought to their original positions again when the vessel is no longer tilted.

When it is desired to discharge the contents of the vessel through the spout without the use of the strainer, the cover C is withdrawn from between the bearing-plate *c* and the top of the vessel, the strip D turned until the lugs *k* have passed the horizontal plane of the lid, as shown in Fig. 4 in dotted lines, when the cover is again passed under the hooks *c* and the spout left entirely clear, when the vessel is tilted.

The handle E referred to consists of a handle provided with a hook, the whole being suitably pivoted upon the vessel, and so arranged that the hook will overlap the edge of the cover C when turned to the position shown in dotted lines, Fig. 2.

Fig. 5 represents a spout provided upon each side with a suitable bearing for the trunnions of the combined cover and strainer. This spout I design to make separate from the pot, and it is adapted to be fitted to any pot, being sold separate for that purpose.

What I claim is—

1. The combination, with a vessel having a spout, of a cover for the spout pivoted across the spout, said cover being provided with a perforated plate extending into the spout at an angle to the cover, and conforming to the form of the spout, as and for the purpose set forth.

2. The combination, with a vessel and vessel cover or lid, the former having a spout, of a cover for the spout pivoted across the spout, said spout-cover being provided with suitable lugs, and with a perforated plate extending into the spout at an angle to the cover and conforming to the form of the spout, as and for the purpose set forth.

3. The combination, with a cooking-vessel, its spout, a combined cover and strainer, and bearing-plates situated upon each side of the spout, and provided with hook-like extensions, of a vessel lid or cover inserted between the vessel-top and the hook-like extensions of the bearing-plates, as set forth.

4. The combination, with a cooking-vessel provided with a spout, and having plates provided with hook-like extensions and situated upon each side of the spout, of a combined cover and strainer for the spout, mounted in the bearing-plates, a vessel cover or lid inserted between the vessel-top and the extensions of the bearing-plates, and a pivoted handle provided with an arm or extension to overlap the lid or cover, as and for the purpose set forth.

5. The bent strip D, partly solid and partly perforated, in combination with vessel A, provided with a discharge-spout having bearings for said strip, as set forth.

6. The vessel A, provided with discharge-spout B and bearing-plates c, in combination with bent strip D, partly solid and partly perforated, said strip having pivoted bearings in plates c and situated within the discharge-spout, as set forth.

7. The vessel A, provided with spout B and plates c, in combination with combined cover and strainer D and lid or cover C, said combined cover and strainer provided with lugs k, as set forth.

In testimony whereof I affix my signature in presence of two witnesses.

AUGUST W. OBERMANN.

Witnesses:
M. J. CLAGETT,
LOUIS NOLTING.